United States Patent
Schimmel

[15] 3,653,799
[45] Apr. 4, 1972

[54] PROCESS FOR COATING AND DYEING POLYOLEFIN FIBERS

[72] Inventor: Karl F. Schimmel, Verona, Pa.

[73] Assignee: PPG Industries, Inc., Pittsburgh, Pa.

[22] Filed: Aug. 1, 1968

[21] Appl. No.: 749,264

[52] U.S. Cl. .................................8/18, 117/76, 117/138.8
[51] Int. Cl. .........................................................D06p 5/00
[58] Field of Search ......................8/166, 18; 117/76, 138.8; 260/23.7 C, 93.7, 72

[56] References Cited

UNITED STATES PATENTS

| | | | |
|---|---|---|---|
| 2,399,179 | 4/1946 | Gerhart | 260/23.7 C |
| 2,404,836 | 7/1946 | Gerhart et al. | 260/23.7 C |
| 3,037,963 | 6/1962 | Christenson | 260/72 |
| 3,168,504 | 2/1965 | Gordon et al. | 260/93.7 |
| 3,281,263 | 10/1966 | Priesing et al. | 8/166 X |
| 3,442,839 | 5/1969 | Gerhart et al. | 260/23.7 C |
| 3,496,129 | 2/1970 | Wismer et al. | 260/23.7 C |

OTHER PUBLICATIONS

Ex parte Schoeneberg et al., Decision of the Board of Appeals, Patent No. 3,190,718, paper No. 27, 4 pages
Ex parte Schoonover et al., Decision of the Board of Appeals, Patent No. 2,743,991, paper No. 23, 6 pages

*Primary Examiner*—George F. Lesmes
*Assistant Examiner*—T. J. Herbert, Jr.
*Attorney*—Chisholm and Spencer

[57] ABSTRACT

Process of dyeing polyolefin textile fibers which comprises coating a polyolefin textile fiber or fabric with an adherent coating of an interpolymer comprising a non-rubbery interpolymer of a polyunsaturated hydrocarbon monomer and at least one monoolefin monomer having a single copolymerizable ethylenic group, said interpolymer having an essentially saturated carbon chain containing a substantial proportion of the total carbon atoms in the polymer molecule and containing sufficient ethylenically unsaturated groups in the polymer molecule to permit substantial curing of films thereof by oxidative mechanism, then contacting the coated fiber with an organic dye, preferably a dye selected from the group consisting of disperse dyes, cationic dyes, and premetallized dyes.

10 Claims, No Drawings

PROCESS FOR COATING AND DYEING POLYOLEFIN FIBERS

Various methods for obtaining textile fibers from polyolefins which have particular receptivity for dyes are known. They include mixing polyolefins with other resins such as polyesters, epoxy resins, and polyimines capable of rendering the fibers dyeable, and these mixtures are spun according to the usual spinning technique. Another method previously employed teaches treating the polyolefin fibers with reactive monomers in the presence of catalysts in order to graft these monomers onto the polymer chain. Typical reactive monomers include: acrylonitrile, styrene and nitrogen-containing polymers such as vinyl-pyrridines. Acid monomers have also been employed. Another method teaches mixing polyolefins with vinyl or acid monomers before the spinning stage in order to incorporate dye-receptive sites. A fourth method employed has been to chemically treat the fibers, for example, by sulfonation, followed by treatment with amines.

It has now been found that polyolefin textile fibers having unusual receptivity for dyes can be obtained by coating the polyolefin fiber with an interpolymer comprising a non-rubbery interpolymer of a polyunsaturated hydrocarbon monomer and at least one monoolefin monomer having a single copolymerizable ethylenic group, said interpolymer having an essentially saturated carbon chain containing a substantial proportion of the total carbon atoms in the polymer molecule and containing sufficient ethylenically unsaturated groups in the polymer molecule to permit substantial curing of films thereof by oxidative mechanism.

POLYOLEFIN FIBERS

The olefin high polymer fibers which may be coated include homopolymers of monoethylenically unsaturated monomers containing two to 10 carbon atoms, inclusive, and and copolymers containing about 70 per cent by weight, and preferably at least about 90 per cent by weight, of a monoolefinic unsaturated monomer containing two to 10 carbon atoms, inclusive, and including about 30 per cent by weight to about 10 per cent or less by weight of at least one other olefinically unsaturated monomer copolymerizable therewith.

Illustrative of the suitable homopolymers and copolymers which can be used as olefin high-polymer substrates for the coatings of this invention are homopolymers such as low density polyethylene, i.e., an essentially ethylene polymer having a density of from about 0.86 to about 0.94 and preferably high density polyethylene, i.e., essentially linear polyethylene homopolymer having a density above about 0.94. Other homopolymers such as polypropylene, polybutene-1, poly(4-methylpentene-1), polyhexene-1, polyheptene-1, and the like, and copolymers such as, for example, ethylene-propylene copolymers, styrene, acrylonitrile polymer, ethylene-butene-1 copolymers, ethylene-ethylacrylate copolymers, ethylene-methyl methacrylate copolymers, ethylene-vinyl acetate copolymers, and the like. This list, however, is intended to be merely illustrative and should not be considered exhaustive of the olefin high polymers which can be used in this invention.

THE COATING RESINS

The interpolymers of ethylenic hydrocarbons and polyunsaturated compounds which form the coating compositions of this invention can be cured by an oxidative mechanism and can be employed in coating compositions applied by conventional means to provide cured coatings of highly desirable properties. Curable interpolymers of this type are disclosed in copending applications Ser. Nos. 413,326, filed Nov. 23, 1964 now U.S. Pat. No. 3,496,129; 460,544, filed June 1, 1965, now abandoned; and others. These interpolymers contain a substantial proportion of a polyunsaturated hydrocarbon, preferably having nonconjugated ethylenic groups, interpolymerized with at least one monoolefin having a single copolymerizable ethylenic group, and are obtained by polymerization in the presence of a transition metal catalyst.

The interpolymers employed in the present invention are characterized by several properties which distinguish them from the rubbery polymers made from dienes and monoolefins. These include the following:

(1) The interpolymers employed herein contain a comparatively high degree of functional unsaturation, which permits them to be substantially cured by an oxidative mechanism. Substantial curing by oxidative mechanism means that a thin film, usually less than 10 mils, of the material upon exposure to air, cures sufficiently to become tack-free and essentially insoluble in aliphatic hydrocarbons, such as heptane. The interpolymers cure by auto-oxidation, absorbing oxygen from the air to build up a crosslinked structure. While curing may continue for days, or even weeks, sufficient curing to achieve a tack-free state takes place within a reasonable time, 24 hours at ordinary room temperature being usually taken as indicative.

The temperature of curing can vary. The preferred interpolymers substantially cure at ambient temperatures, and in any event below 100° F., but desirable materials can be produced which require somewhat higher curing temperatures, although in all cases the cure mechanism is predominantly oxidative. It is to be understood that the curing characteristics above serve to define the interpolymers herein but do not limit the possible methods of curing that can be used; for example, driers such as metal naphthanates can be employed to accelerate the cure, or a high oxygen atmosphere and higher temperatures than the minimum necessary can be used for the same purpose. Crosslinking agents can also be added, or cure can be induced by ultraviolet or other radiation, with or without the presence of photosensitizers, such as benzophenones.

The interpolymers utilized in accordance with this invention contain at least about 2 weight per cent unsaturation, as defined below, and preferably contain 2.5 per cent or more, with at least about 3 per cent being desirable when oxidative curing is employed. They may have up to about 25 weight per cent unsaturation, or even more.

(2) As indicated, the curing properties of these interpolymers differ from that of the rubbery polymers, and the extent of crosslinking thereby achieved is much higher. Whereas the rubbery polymers have a very low crosslink density, and require a vulcanizing agent to achieve that, films of the present interpolymers, contrastingly, dry in air without an added curing agent.

(3) The interpolymers herein are of lower molecular weight than are the rubbery polymers, as indicated by their lower intrinsic viscosity. Thus, the intrinsic viscosity of the known rubbery polymers is at least 1.0, and usually 1.5 or higher, corresponding to a molecular weight of 50,000 or more. This is considerably higher than the intrinsic viscosity of the present interpolymers, which preferably have an intrinsic viscosity no higher than about 0.9, and usually 0.6 or lower.

Intrinsic viscosity is described, for example, in the book by Allen entitled "TECHNIQUES OF POLYMER CHARACTERIZATION," Butterworth Publications, Ltd., London (1959); the values herein being measured in benzene at 25° C., using an Ubbelohde Dilution Viscometer.

(4) The present interpolymers are much more soluble in organic solvents than are the aforesaid rubbery polymers, permitting them to be dissolved in appreciable concentrations while maintaining a usable solution viscosity. For example, the preferred interpolymers have a Gardner-Holdt viscosity of Z or lower at 20 per cent solids concentration in aromatic naphtha (e.g., Solvesso 100) or xylene, and can be applied from solvent-based compositions that have desirable application properties. There can be obtained solutions of the present interpolymers in benzene, xylene, aromatic naphtha or other solvents containing as much as 70 per cent or more resin solids and having a utilizable viscosity, whereas solutions of the rubbery polymers containing only about 10 to 15 per cent solids are usually completely unworkable.

Many of the properties of these interpolymers are attributable in large part to their structures, which includes an essentially saturated carbon chain as the polymer backbone, this chain containing a substantial proportion (i.e., 20 per cent or more) of the total carbon atoms in the polymer molecule. Only a small amount of ethylenic unsaturation is in the polymer backbone, principally in terminal position, with at least a major part of the unsaturated linkages remaining in the polymer molecules being in pendant groups attached to the main polymer chain. The extent of unsaturation is sufficient to permit curing by oxidative mechanism, which in general requires at least about 2 per cent by weight of unsaturation in the polymer. "Per cent by weight of unsaturation," as employed herein, refers to the weight of groups of the structure

compared to the total weight of interpolymer. For instance, 2 per cent by weight of unsaturation means each 100 grams of interpolymer contain 2 grams of carbon present in groups of the structure

Accurate determination of the extent of unsaturation in these products by common analytical techniques is quite difficult. For example, ordinary iodine value determinations have been found to be unreliable, and accurate analysis by chemical means in general required very tedious and time-consuming procedures. One method which can be used is infrared spectroscopic examination, in which the quantitative extent of unsaturation is determined by comparing the characteristic peak obtained from the interpolymer with that of a known material of similar structure and previously determined unsaturation level. Another method for determining the extent of unsaturation is by means of nuclear magnetic resonance spectroscopy, as described in the foregoing copending applications.

Because the reactivity of the interpolymers herein is such that small but significant amounts of unsaturation may be lost by oxidation or other reaction, handling and exposure of samples used for analysis should be minimized. Otherwise, low values may be obtained on analysis. For this reason, it is usually better to rely on the curing characteristics as indicative of the necessary extent of unsaturation, with numerical values being used chiefly for comparison of samples handled similarly.

The proportions of the components of the interpolymer can be varied widely, it being necessary only to interpolymerize sufficient polyunsaturated hydrocarbon with the monoolefin or monoolefins to provide the desired level of unsaturation in the polymer, this amount varying with the particular polyunsaturated compound. For instance, there should be interpolymerized along with the monoolefin or monoolefins at least about 11 per cent of dicyclopentadiene or similar diene.

Among the polyunsaturated compounds that can be employed in producing the interpolymers described herein are various dienes and other polyenes. Dienes containing non-conjugated ethylenic groups, and to a lesser extent conjugated alicyclic dienes, are preferred. Included among the polyunsaturated compounds that can be employed are cyclic polyenes such as cycloalkadienes; substituted norbornenes, e.g., 5-alkenyl-2-norbornenes, norbornadiene-(bicyclo[2.2.1]c hepta-2,5-diene) and substituted norborna-dienes, e.g., 2-alkyl norbornadienes; unsaturated terpenes, such as limonenes; and similar compounds. The polyene may contain substituents, such as halogen or oxygen-containing radicals, but in general it is preferred to employ unsubstituted hydrocarbons containing only carbon and hydrogen. Certain dienes exert a marked influence in lowering molecular weight, even when present only in very small amount. Norbornadiene and 4-vinylcyclohexane-1 have this effect and they are preferably included in the polyunsaturated hydrocarbon component when low molecular weight products are especially desired.

The preferred polyunsaturated compound utilized in the coating compositions of the instant invention is dicyclopentadiene. Other representative examples of specific polyunsaturated compounds which can be utilized are:

1,4-Pentadiene
1,9-Decadiene
3,3-Dimethyl-1,5-hexadiene
1,4-Hexadiene
1,9-Octadecadiene
6-Methyl-1,5-heptadiene
7-Methyl-1,6-octadiene
11-Ethyl-1,1-tridecadiene
1,3-Cyclopentadiene
1,3-Cyclooctadiene
5-Methyl-1,3-cyclopentadiene
1-Methyl-3-isopropyl-1,3-cyclopentadiene
Tricyclopentadiene
5-Methyl-1,3-cyclopentadiene dimer
2-Methyl-4-ethyl-1,3-cyclopentadiene dimer
1,4-Cyclohexadiene
1,5-Cyclooctadiene
1,5-Cyclododecadiene
1,5,9-Cyclododecatriene
1,4,6-Cyclooctatriene
5-(2'-Butenyl)-2-norbornene
5-(2'-Ethyl-2'-butenyl)-2-norbornene
5-(1,5-Propenyl)-2-norbornene
5-(2'-Heptyl-1'-undecenyl)-2-norbornene
5-(2'-Propyl-2'-pentenyl)-2-norbornene
5-Methylene-2-norbornene
Bicyclo[2.2.1]Hepta-2,5-diene
2-Methyl norbornadiene
2-Ethyl norbornadiene
2-Isopropyl norbornadiene
2-Heptyl norbornadiene
1,8(2)-p-Menthadiene
Divinylbenzene
5-Vinylbicyclo[2.2.1]hept-2-ene
Bicyclo[4.3.0]nona-3,7-diene Generally speaking, any monoolefin having a single copolymerizable ethylenic group can be interpolymerized with the polyene. Coatings satisfactory for many purposes can be made from interpolymers of the polyunsaturated compound with only a single monoolefin, e.g., copolymers of ethylene and dicyclopentadiene, or propylene or dicyclopentadiene. For other purposes, it is preferred to employ interpolymers of at least two comonomers with the polyunsaturated compound. In either event, it is preferred that ethylene comprise a substantial proportion of the interpolymer, i.e., at least about 20 per cent by weight. Classes of preferred interpolymers include copolymers of a non-conjugated diene and ethylene, and interpolymers of a non-conjugated diene, ethylene, and at least one other monoolefin having a single terminal ethylenic group.

Of the large number of usable monoolefins, the preferred comonomers include those having the formula

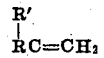

where R is alkyl having, for example, up to about 20 carbon atoms, or aryl, and R' is hydrogen or alkyl of up to about 20 carbon atoms. Compounds of this class include propylene, 2-methylpropene, 2-propylhexene-1, 1-butene, 4-methyl-1-pentene, 1-pentene, 1-hexene, 1-octane, 5-methyl-1-nonene, 5,6,6-trimethyl-1-decene, 1-dodecene, and 1-tetradecene.

When two or more comonomers are utilized, their proportions are not critical since, as mentioned, copolymers of a single monoolefin with the polyunsaturated compound can be employed. The preferred proportions vary depending on the identity of the particular monomers. For example, interpolymers of ethylene, propylene, and a non-conjugated diene, usually dicyclopentadiene, generally contain from about 10 per cent to about 40 per cent of propylene, and from about 5 per cent to about 50 per cent of the diene, while preferred copolymers contain from about 20 per cent to about 90 per cent of ethylene and from about 10 per cent to about 80 per cent of a diene such as dicyclopentadiene. It will be understood that the minimum usable amount of any diene depends to some extent upon its molecular weight. (The above percentages are by weight; the same is true of all parts and percentages throughout this specification unless otherwise specified.)

The interpolymerization of the foregoing monomers is carried out in the presence of a transition metal catalyst of the Ziegler type; examples of Ziegler catalysts (sometimes called Ziegler-Natta catalysts) are described in U.S. Pat. Nos. 3,153,023; 3,159,615; 3,168,504; and others. They generally involve interaction products of an alkyl aluminum compound and a transition metal compound. In making the interpolymers herein a preferred catalyst is composed of an organic vanadium compound and an alkyl aluminum halide, with the organic vanadium compound being usually vanadium tris(acetyl-acetonate) or vanadium oxybis(acetyl-acetonate). The alkyl aluminum halide co-catalyst is typically ethyl aluminum sesquichloride. Other catalyst systems can also be utilized.

In carrying out the interpolymerization, there is employed a liquid reaction medium, which can be an organic solvent or one of the reactants in liquid form. Purified benzene, xylene, toluene, chlorobenzene, or a similar aromatic solvent is generally utilized, although other solvents can be employed. For efficient operation, care should be taken to exclude oxygen and moisture. The temperature is maintained at room temperature of preferably below, e.g., 20° C. or lower, with temperatures as low as −80° C. or lower being advantageously utilized. The catalyst and reactants can all be added initially, or one or more can be added continuously or incrementally. Gaseous reactants are generally fed to the reaction vessel as the polymerization progresses, maintaining saturation of the mixture.

Atmospheric pressure can be utilized in carrying out the interpolymerization reaction, as can elevated pressures up to 1,000 atmospheres or more. At the end of the polymerization, residual catalyst can be removed if desired by washing the reaction mixture with water or acid. If desired, part of the solvent can be distilled off along with unreacted polyene or other reactants, and these can be recovered or recycled. These polymers are more fully described in Application Ser. No. 413,326, filed Nov. 23, 1964 now U.S. Pat. No. 3,496,129, which is incorporated herein by reference, including the examples thereof. Examples of these polymers include:

EXAMPLE A

A clean, dry reaction vessel was flushed with nitrogen gas and charged with 10 liters of dried benzene. Ethylene and propylene were passed into the solvent at a rate of 6.0 liters and 12.0 liters per minute, respectively, and there were added 176 milliliters of dicyclopentadiene, 50.4 milliliters of bicyclo[2.2.1]hepta 2,5-diene, and 20.0 milliliters of a 1.5 molar solution of ethyl aluminum sesquichloride in benzene. While maintaining the temperature at about 5° C., 50 milliliters of a 0.02 molar solution of vanadium oxybis(acetylacetonate) in benzene were introduced. The off-gas rate dropped and the ethylene and propylene rates were increased to 10 to 20 liters per minute for 1 minute, during which the off-gas rate again rose. There were then added 5 milliliters of bicycloheptadiene, 17.6 milliliters of dicyclopentadiene, and 50 milliliters of the vanadium oxybis(acetylacetonate) solution. When absorption decrease, the above additions were made again, and this repeated for a total of six additions. The polymerization was carried out for a total of 44 minutes from the time of the first vanadium catalyst addition. Methanol was added to the reaction mixture and it was washed with aqueous HCl, and then washed acid free with distilled water. The benzene was stripped at reduced pressure and replaced with about 2 liters of Enjay 100, aromatic naphtha, boiling range 150°–170° C., and stripping continued until the solution had a solids content of about 35.4 per cent and a Gardner-Holdt viscosity of Z-2. Infrared analysis of the product showed the absence of free dicyclopentadiene and indicated that the approximate polymer composition was about 50 per cent ethylene, about 20 per cent propylene and about 30 per cent dicyclopentadiene, all in polymerized form. The intrinsic viscosity of the interpolymer was 0.30 deciliter/gram.

EXAMPLE B

A thoroughly clean and dry reaction vessel and fittings were flamed and cooled under a stream of nitrogen. The vessel was then charged with 3 liters of dried benzene and sparged with nitrogen for 15 minutes. While passing ethylene and propylene at the rate of 6 liters per minute each into the solution, there were added 52.8 milliliters of dicyclopentadiene, the mixture was cooled to 5° C., and 6.0 milliliters of a 1.0 molar solution of ethyl aluminum sesquichloride in benzene were then added. Cooling was maintained throughout the polymerization, which was initiated by the addition of 15.0 milliliters of a 0.02 molar solution of vanadium oxybis(acetylacetonate) in benzene. The concentration of the vanadium compound was about 0.1 millimoles per liter and the concentration of the ethyl aluminum sesquichloride was 2.0 millimoles per liter. Polymerization began immediately, as evidenced by the rise in the temperature to 8° C. and complete absorption of all gases passing into the solution, i.e., no off-gas could be observed. After about 1 minute, off-gas began to be observed once more; reaction conditions were maintained for 6 minutes after the addition of the vanadium compound, during which time the temperature dropped slowly to 5° C.

There were then added 20 milliliters of methanol and the reaction mixture was divided into equal portions; each portion was washed with 5 milliliters per liter of concentrated HCl and then washed with 50 milliliter increments of distilled water until acid-free. The portions were recombined and benzene was removed by evaporation at reduced pressure at room temperature or below. When most of the benzene had been removed, about 2 liters of aromatic naphtha (Solvesso 100; boiling range 150° C. to 170° C.) were added and stripping was continued until about three-quarters of the Solvesso 100 had been removed, thus also removing the residual dicyclopentadiene and benzene. The solution obtained had a solids content of 11.5 per cent and a Gardner-Holdt viscosity of L.

EXAMPLE C

A thoroughly clean and dry reaction vessel was flushed with nitrogen gas, charged with 2.5 liters of benzene, and sparged with nitrogen for 15 minutes. Ethylene and propylene were passed into the solvent at a rate of 2.0 liters and 4.0 liters per minute, respectively, and this was maintained throughout the polymerization. There were then added 25 milliliters of dicyclopentadiene and, after cooling to 7° C., 7.5 milliliters of a 1.0 molar solution of ethyl aluminum sesquichloride in benzene were added. While maintaining the temperature between 7° C. and 11° C., 25 milliliters of a 0.01 molar solution of vanadium oxybis(acetylacetonate) in benzene were introduced, whereupon off-gas rate dropped to zero, then rose in 2 minutes to 360 liters per hour, indicating that absorption had ceased. Another 26 milliliter portion of the vanadium oxybis(acetylacetonate) solution was added, whereupon again all the gas added was absorbed for a short time and then absorption ceased. The catalyst addition was again repeated, and after absorption ceased once more, 25 milliliters of dicyclopentadiene were added, along with another catalyst portion as above. Three more additions of the vanadium catalyst were made, in each case after absorption had ceased.

The polymerization was carried out for a total of 40 minutes from the time of the first vanadium catalyst addition, and was terminated by the addition of 10 milliliters of methanol. The reaction mixture was then washed with 30 milliliters of concentrated HCl, and then washed acid-free with 15 one-liter portions of distilled water. The benzene was stripped at reduced pressure, as in Example A, and replaced with about 1.5 liters of mineral spirits, and stripping continued until most of the mineral spirits had been removed. There was obtained 247 grams of solution containing 78.8 grams of interpolymer (solids content of 31.0 per cent). Infrared analysis of the product showed the absence of free dicyclopentadiene and indicated that the approximate polymer composition was 40 per cent ethylene, 24 per cent propylene, and 36 per cent dicyclopenta-diene, all in polymerized form.

EXAMPLE D

A clean, dried reaction vessel was flushed with nitrogen, charged with 3.0 liters of aromatic naphtha (Solvesso 100) and sparged with nitrogen for 15 minutes. Ethylene and propylene were then passed into the solvent at a rate of 2.0 liters per minute each. There were added 8.4 milliliters of a 1.0 molar solution of ethyl aluminum sesquichloride in benzene, and the mixture was cooled to 7° C. The rate of ethylene and propylene was decreased to 1.0 liters per minute each and 20 milliliters of dicyclopentadiene were added. There were then added 20 milliliters of a 0.01 molar solution of vanadium tris(acetylacetonate) in benzene. After 2 minutes, the rate of ethylene and propylene addition was again increased to 2.0 liters per minute each and continuous addition of 2.0 milliliters per minute of the vanadium compound solution and 1.0 milliliters per minute of dicyclopentadiene was begun.

The temperature rose to 12° C. and then slowly fell to 7° to 9° C. during the remainder of the polymerization. After 9 minutes from the initial vanadium catalyst addition, the rate of addition of the vanadium catalyst solution was increased to 4.0 milliliters per minute and the addition of dicyclopentadiene was increased to 2.0 milliliters per minute. After 6 more minutes, the rate of ethylene and propylene addition was decreased to 1.0 liters per minute each. After 32 more minutes, the addition of dicyclopentadiene was ended, and after another 11 minutes the addition of the vanadium compound was complete. Ethylene and propylene were passed into the mixture for another 20 minutes, and then 10 milliliters of methanol were added. A total of 210 milliliters of the vanadium compound solution and 90 milliliters of dicyclopentadiene had been added.

The clear product solution was washed three times with 5 per cent aqueous HCl, then washed with distilled water until acid-free. The solution was then concentrated at 12 to 20 millimeters of mercury pressure and 35° to 45° C. There was obtained a solution having a solids content of 9.4 per cent and containing a total of 66.9 grams of interpolymer.

EXAMPLE E

Following the procedure of Example B, an interpolymer was produced from ethylene, propylene and 5-methylene-2-norbornene, using 2.5 liters of benzene, 13.3 grams of 5-methylene-2-norbornene, 3.6 milliliters of a 1.4 molar solution of ethyl aluminum sesquichloride in toluene, and 12.5 milliliters of a 0.02 molar solution of vanadium oxybis(acetylacetonate) in benzene. The ethylene and propylene were added at a rate of 6.0 liters per minute each. After the polymer solution had been washed with acid and water, benzene was removed and Solvesso 100 was added and partially distilled at 25° C. and reduced pressure. There was obtained 689 grams of a solution containing 41.4 grams of interpolymer.

EXAMPLE F

A clean, dry reaction vessel was flame-dried and flushed with nitrogen. One liter of purified, dry benzene was charged and sparged with nitrogen for 10 minutes. 20.4 c.c. of dicyclopentadiene and 1.1 c.c. of ethyl aluminum sesquichloride were added. The mixture was brought to a temperature of 20° C. The nitrogen sparge was discontinued and ethylene introduced into the reactor until the reactor and contents are saturated with ethylene at 20° C. Excess ethylene was then vented to the atmosphere. The ethylene feed was discontinued and with the effluent valve closed, hydrogen was introduced to correct the partial pressure to 40 p.s.i.g. Ethylene was then introduced to bring the pressure to 50 p.s.i.g. (80 volume per cent $H_2$ charged) and the ethylene feed allowed to remain open to the reactor at 50 p.s.i.g. 2 c.c. of vanadium tris(acetylacetonate) was injected into the reactor at 20° C., whereupon the temperature rise occurred and an uptake of ethylene was noted. The exotherm was controlled by cooling. After about 5 minutes, no further evidence of reaction was noted in the polymerization mixture.

The polymerization mixture was then removed from the reactor and a small amount of methanol added to quench the catalyst.

The mixture was then worked up as follows: washed twice with 5 c.c./liter aqueous HCl; then washed with liter portions of deionized water until neutral. Benzene and emulsified water were removed at reduced pressure until a noticeable increase in viscosity occurred, at which time 1,000 c.c. of aromatic naphtha, boiling range 150°–170° C., were added. The excess solvent is stripped at reduced pressure until the desired viscosity and/or solids content is reached (unreacted dienes co-distill with the naphtha):

| | |
|---|---|
| Per cent solids | 25.7 |
| Gardner-Holdt viscosity | A- |
| Ash content | 0.029 |
| Iodine number | 57.6 |
| Wt. per cent D.C.P.D. (NMR) | 40.3 |
| Intrinsic viscosity | 0.158 |

EXAMPLE G

A clean, dry reaction vessel was flame dried and flushed with nitrogen. One liter of purified, dry benzene was charged and sparged with nitrogen for 10 minutes. 20.4 c.c. (0.15 milliliter) of dicyclopentadiene and 1.2 c.c. of ethyl aluminum sesquichloride were added and the mixture brought to a temperature of 20° C. The nitrogen sparge was discontinued and the solution saturated with propylene ($C_3$), the excess being vented to the atmosphere. Hydrogen was then added to bring the pressure to 40 p.s.i.g. A mixture of propylene ($C_3$) and ethylene ($C_2$) ($C_3/C_2$ - 1.5 volume ratio) to 50 p.s.i.g. and this feed was maintained with a back pressure of 50 p.s.i.g. 0.1 mole of vanadium tris-(acetylacetonate) was injected into the reactor at 20° C., whereupon an exotherm was noted, along with a feed mixture uptake and exotherm, which was controlled by cooling back to 20° C. After no further evidence of reaction was noted, the reaction mixture was removed from the reactor and a small amount of methanol added to deactivate the catalyst.

The mixture was worked up as follows: washed twice in 20 c.c. HCl/liter aqueous HCl. The polymer was then precipitated in methanol and redissolved in aromatic naphtha, boiling range 150°–170° C. and brought to the desired viscosity by stripping at reduced pressure.

| | |
|---|---|
| Per cent solids | 48.7 |
| Gardner-Holdt viscosity | X-Y |
| Ash content | 820 p.p.m. |
| Iodine number | 38.9 |
| Acid value | 0.0 |
| Intrinsic viscosity | 0.21 |
| NMR analysis: | |
| DCPD | 36.4 |
| $C_3$ | 29.1 |
| $C_2$ | 34.6 |

While the use of the above-described interpolymers are generally preferred, properties of the aforesaid interpolymers may be modified by reacting the interpolymer with a controlled amount of oxygen or oxidizing agent, so as to effect partial oxidation of the interpolymer. The partial oxidation provides such properties as better compatibility with other co-reactive materials, improved pigment wetting, better adhesion to many substrates, and other desirable characteristics. In many cases, curing times are shorter with the oxidized polymers, providing harder films in relatively short times at room temperature. These interpolymers may also be employed as film formers in the instant invention.

The oxidation of the above interpolymers can be carried out in several ways. For instance, air, oxygen, ozone or the like, can be passed through the interpolymer or a solution of the interpolymer, or an oxygen-releasing agent can be added, or oxygen-containing functional groups can be introduced by reaction of the interpolymer with a material which provides oxidation of the double bonds. Such reactive materials include, for example, peroxides such as benzoyl peroxide and hydrogen peroxide, perbenzoic acid, potassium permanganate, peracetic acid, and the like.

The preferred method is passing oxygen or an oxygen-containing gas through a solution of the interpolymer. This is generally carried out at moderately elevated temperatures, e.g., 50° C. to 150° C., since the oxidation is relatively slow at room temperature. Atmospheric pressure is usually employed because of convenience, although elevated pressures are also useful. Driers, such as metal salts of fatty acids, e.g., the naphthenates, linoleates and resinates of cobalt, lead and similar metals, or other oxidation catalysts, can also be included, if desired.

The amount of oxygen incorporated in the partially oxidized interpolymers herein can be varied, but usually at least about 0.5 per cent by weight of added combined oxygen should be introduced into the polymer molecule, i.e., at least about 0.5 per cent by weight of oxygen should be introduced as a result of the oxidation reaction as described therein. The exact mechanism of the reaction and the precise nature of the oxidized product are not known. It is believed that oxygen reacts with the double bonds in the interpolymer; from infrared spectrographic examination it is known that at least part of the combined oxygen results in hydroxyl, carboxyl, ether, and other oxygenated groups attached to carbon atoms in the polymer.

The product after the oxidation reaction should be curable, that is, crosslinkable to a hard state, but at the same time retain the viscosity and other characteristics suitable for its intended use, for example, as a coating composition. Thus, the amount of oxidation should not be sufficient to excessively crosslink the interpolymer prematurely. In general, the extent of oxidation should be controlled so as to provide a product which remains soluble in organic solvents, such as ketones, alcohols, aromatic hydrocarbons, aliphatic hydrocarbons, and the like. If, as is usually the case, the oxidation reaction is carried out in organic solvent solution, insolubilization of the interpolymer is easily observed and avoided. While it is only necessary to avoid excess crosslinking as discussed above, in most cases the amount of added combined oxygen does not exceed about 10 per cent by weight of the total polymer.

If an excessive amount of oxidation and crosslinking occurs, as evidenced by incipient gel formation, it can be reversed by addition of a trace or a small amount of alcohol, such as ethanol, isopropanol, or other lower alkanol. This affords considerable latitude in carrying out the oxidation process.

As indicated above, the oxidation reaction is preferably carried out using an organic solvent solution of the interpolymer. Essentially any solvent can be employed for this purpose so long as the solvent does not itself unduly oxidize or otherwise interfere with the desired reaction. Aliphatic hydrocarbons, such as pentane, hexane, heptane, and the like; aromatic hydrocarbons, such as benzene, toluene, and similar compounds; and alkylated aromatic hydrocarbon solvents, such as aromatic hydrocarbon solvents, such as aromatic naphtha, are effectively utilized in this manner, although other solvents, such as ketones, esters and alcohols, can also be employed. Mixtures of the aforesaid solvents, such as are found in aliphatic and aromatic naphthas commercially available, can also be used.

In the coating compositions exemplified above, the interpolymers of the invention provide the essential or sole film-forming component. However, useful coating compositions are also achieved by combining the interpolymers herein with other resinous materials, including not only plasticizers and other non-coreactive products, but also various substances which co-react with the interpolymer during curing or before, as while formulating or even during polymerization. Advantages of the use of coreactive materials with the interpolymers include the attainment of specific properties of the cured coatings, modification of solution properties, and similar objectives.

Among the compositions containing co-reactive materials along with the interpolymers are those described in copending application, Ser. No. 413,327, filed Nov. 23, 1964, now U.S. Pat. No. 3,442,839. In these compositions, the interpolymers of the present invention are combined with an unsaturated glyceride oil.

Other coreactive materials which can be combined with these interpolymers include various polymers containing olefinic unsaturation or other functional groups or sites, which can react with the interpolymer or with oxidation products of the interpolymer during curing. These include, for example, oil-modified alkyd resins, such as drying or semi-drying oil-modified glycerol phthalate resins; glyceride oils or oil-modified alkyd resins reacted with cyclopentadiene or a polymer thereof, such as those described in U.S. Pat. Nos. 2,399,179 and 2,404,836; epoxidized butadiene polymers, such as those known as Oxiron resins; polymers or copolymers of unsaturated aldehydes, such as acrolein, polymerized through the aldehyde groups leaving residual unsaturation; maleates, optionally in the presence of reactive solvents such as styrene; hydrocarbon resins containing ethylenic unsaturation, such as polymerized petroleum fractions, including residues known as distillate bottoms; reaction products of drying or semi-drying oils and unsaturated dicarboxylic acids or anhydrides, such as the so-called maleinized oils, e.g., the adduct of maleic anhydride and linseed or soya oil; reactive solvents, such as styrene, vinyl toluene, or other vinyl aromatic hydrocarbons, or acrylates or methacrylates, e.g., methyl methacrylate; resins containing free -SH groups, such as those produced by reacting dichlorodiethylformal and alkali polysulfide (Thiokol resins); epoxy resins, such as the reaction products of Bisphenol A and epichlorohydrin, epoxidized alicyclic compounds, and other polyepoxides and monoepoxides; interpolymers of unsaturated carboxylic acid amides and other ethylenic monomers, which may be aldehyde-modified and etherified, for example, those disclosed in U.S. Pat. No. 2,978,437 and U.S. Pat. No. 3,037,963; aminoplast resins, such as melamine-formaldehyde and urea-formaldehyde condensation products; and others of similar chemical structure and reactivity.

The textile fibers of the invention are coated with the resins described above in a conventional manner, for example, the fibers are passed through a solution of the specific resin of choice and then dried. While the resins described above cure at room temperature within reasonable times for some purposes, i.e., within 24 hours, obviously in an industrial process it is desirable to force dry or cure the polymer coatings in an oven at a temperature of about 100° F. to about 400° F. for times ranging from about 5 to about 30 minutes.

Other methods include coating from an emulsion of the desired resin, spraying, and the like. When a finished fabric rather than individual fibers are coated, the resin may be applied by a printing technique. In this manner areas of varying dye receptivity may be created, thereby producing patterns upon dyeing.

The coated textile fiber is dyed in a conventional manner, that is, movement of the fiber through the liquid dye bath, circulation of the dye liquor through stationary fiber or a combination of movement of both liquor and fiber. Numerous apparatus and techniques are set forth in the art, for example, see Kirk-Othmer ENCYCLOPEDIA OF CHEMICAL TECHNOLOGY, Vol. 5, Dyes (Application), 1950.

After dyeing, the fiber is scoured, that is, washed to remove dye mechanically retained but not fixed to the fiber. Generally this is accomplished by washing in a detergent solution.

As previously stated, the dyes which may be employed are organic dyes and preferably a dye selected from the group consisting of disperse dyes, cationic dyes, and premetallized dyes.

Cationic dyes or basic dyes owe their name to amine or imino groups present. Examples include Diarylbetonimines, for example, Auramine (CI Basic Yellow 2); Triarylmethanes, for example, Crystal Violet (CI Basic Violet 3); Azines, for example, Saframine (CI Basic Red 2); Thiazines, for example, Methylene Blue (CI Basic Blue 9); Oxazines, for example, Nile Blue A (CI Basic Blue 12); Xanthenes, for example, Rodamine B (CI Basic Violet 10); Azos, for example, Acridine Orange N (Basic Orange 14); Pholymethene or Cyanines, for example, Astro Phloxine 5G (CI Basic Orange 10).

Premetallized dyes are those dyes usually having a metal in a 1:1 or a 2:1 complex. These dyes are known with or without solubilizing groups. Some major classes include 1:1 metal complexes with sulfonic acids for solubility, i.e., acid premetallized; 1:1 metal complex reacted with a colorless complex builder containing solubilizing groups other than sulfonic acid; 1:2 metal complex without any solubilizing group, i.e., premetallized disperse dyes. The metal contained in a premetallized dye is usually chromium or cobalt; however, copper, zinc, nickel, iron and other metals may be employed. Premetallized dyes include the Neolan Palatine Fast, Perlon Fast, Nonastral Fast Blue and Fast Green, Napthol Green, Eriochrome Black I, Mordant Black I (CI 15710), Chromoxane Brilliant Red BL, Mordant Red 27 (CI 45180), Perlon Fast Red 2 BS (CI 15675); Perlon Fast Yellow G (CI 18690). Preferably, the premetallized dye employed is a premetallized disperse dye.

Dispersed dyes are dyes which are applied from near-colloidal aqueous dispersions to textile fibers in which the dyes literally dissolve to produce the desired coloration.

Dispersed dyes include colors of the azo, azomethine, nitroarene, and anthraquinone chemical classes. These include: Celliton Fast Yellow G (CI 11855), Pr. 242, Celliton Yellow 5G (CI 12790), Pr. 245; Celliton Yellow 7G (CI 48000); Fast Yellow GLF; Celliton Discharge Pink BRF; Celliton Scarlet B, Pr. 244; Dispersol Fast Red R; Celliton Discharge Blue 5G (CI 11435); Celliton Fast Brown 3R; SRA Golden Yellow XIII; SRA Golden Orange I.

Specifically among the anthraquinone, derived dispersed dyes are included: Duranol Brilliant Yellow 6G (CI 58900); Celliton Orange; Celliton Orange R (CI 60700); Duranol Red B; Celliton Fast Pink RF, Pr. 370; Celliton Fast Pink B, Pr. 234; Celliton Fast Pink FF 3B (CI 62015); Duranol Red 3B, Pr. 235; Celliton Fast Red Violet R; Artisil Direct Violet RRP, Pr. 237; Celliton Fast Violet B (CI 62030), Pr. 240; Celliton Fast Violet 6B (CI 61105); Cellitron Fast Blue B (CI 61500); Duranol Brilliant Blue B; Celliton Fast Blue BF; Celliton Fast Blue FFR (CI 61505), Pr. 228; Celliton Fast Blue FW (CI 61510); Celliton Fast Blue FFB (CI 62035); Celliton Fast Blue FFG (CI 62050); Celliton Blue Extra; Duranol Blue CB; Duranol Blue G (CI 63305); Celliton Blue 3G (CI 64505); Celliton Fast Blue Green B (CI 62500); SRA Green Blue II, Pr. 229; and Celliton Fast Green 5B.

The above polyolefin fibers were coated with the resin described above and dyed with the classes of dye described obtaining the increased dyeing hereinabove described as illustrated by the following Examples. All parts and precentages in the Examples, as well as the remainder of the specification are by weight unless otherwise specified.

EXAMPLE I

The resin employed herein was prepared in the manner set forth hereinabove by reacting ethylene and di-cyclopentadiene in benzene employing an ethyl aluminum sesquichloride-vanadium-trisacetylacetonate catalyst and hydrogen molecular weight control. The resin composition was 57.7 per cent ethylene and 43.3 per cent dicyclopentadiene with an intrinsic viscosity of 0.28. This resin was designated Resin I.

Polypropylene fiber was placed into a 2 per cent solution of Resin I in trichloroethylene and heated at 165° F. for 5 minutes, then the fabric was removed and air dried.

Dye baths were prepared by placing 0.0724 parts of Foron Brilliant Pink E-FG (CI Dispersed Red 55) (disperse dye) into 250 parts of water. To two such baths were added 1.12 parts of the resin treated fabric above and a control comprising the untreated fabric. Both dye baths were refluxed for 1 hour, then the fabrics were removed and entered into a scour bath containing 0.375 parts of nonionic detergent nonylphenoxypoly-(ethylenoxy)ethanol (Igepol CO 630) and 0.94 parts of $Na_4P_2O_7$ in 275 parts of water and boiled for 15 minutes. The fabric was rinsed with water and dried. The treated fabric had 50 per cent more dye deposited than the untreated fabric.

EXAMPLE II

An emulsion was prepared from Resin I, diluted to 48.7 per cent solids in heptane. The oil phase or organic phase of the emulsion contained 2 parts of mineral spirits, 3 parts of heptane and 2.8 parts of resin to which was added 0.5 parts oleic acid and 0.75 parts isooctyl phenyl polyethoxy-ethanol (Triton X-114). The organic phase was mixed in a high speed blender with 3 parts of water containing 2 parts of $NH_3OH$. Into the emulsion then was placed 1.18 parts of polypropylene fabric. The fabric was wrung out and air dried.

This fabric and a control (untreated fabric) were dyed, scoured and rinsed as in Example I. The fabric of the invention retained 390 per cent more dye than the untreated fabric.

EXAMPLE III

A dye bath was prepared by placing 0.2667 parts of cationic dye (Sandocryl Blue B-2GLE P.A.F.-CI Basic Blue B) in 200 parts of water containing 5 parts of nonionic detergent nonylphenoxy-poly(ethylenoxy)ethanol (Igepol CO 630) and shaken vigorously. The solution was diluted to 500 parts with water and stirred for 30 minutes, then divided into two parts.

Into these dye baths were entered 1.17 parts of polypropylene fabric which immediately prior had been immersed in the resin emulsion described in Example II for 30 seconds and then wrung out; and 1.11 parts of the same polypropylene fabric in an untreated state as a control. The fabrics were boiled in the dye bath for one hour, then scoured and rinsed as in Example I. As measured by reflectance, 778 per cent more dye was retained on the fabric of the invention as was retained on the control.

EXAMPLE IV

The dye bath employed in the Example was prepared by dispersing 0.1420 parts of Lanasyn Red BL PAT (CI Acid Red 215) in 200 parts of water containing 0.5 parts of nonionic detergent, nonylphen-oxypoly(ethylenoxy)ethanol (Igepol CO 630) diluting to 500 parts and mixing well. Equal amounts of an untreated control and polypropylene fabric treated as in Example II were dyed, scoured, and rinsed as in Example III. By reflectance 191 per cent more dye was retained on the fabric of the invention.

In these and other tests, it has been shown that pretreatment of the polyolefin fabrics hereinabove described with the resins described greatly increases the dyability of the fibers. Good results are obtained not only with compositions specifically exemplified but with other compositions employing, for instance, other fabrics, other dyes, as well as other resins, including such as those of Examples A through G hereinabove.

According to the provisions of the patent statutes, there are described above the invention and what are now considered its best embodiments. However, within the scope of the appended claims, it is to be understood that the invention can be practices otherwise than as specifically described.

I claim:

1. A method of improving dye reception of polyolefin textile fibers which comprises coating a polyolefin fiber with a coating composition of a low-molecular weight, non-rubbery interpolymer of a cyclic polyene and at least one monoolefin having a single copolymerizable ethylenic group, said interpolymer having an essentially saturated carbon chain containing a substantial portion of the total carbon atoms in the polymer molecule and containing at least about 2.5 percent by weight of ethylenic unsaturation in the polymer molecule, said interpolymer being further characterized by having an intrinsic viscosity of about 0.6 or below; drying said coating and then contacting said coated polyolefin fiber with a liquid dye bath selected from the group consisting of disperse dyes, cationic dyes and premetallized dyes.

2. A method as in claim 1 wherein the dye is a disperse dye.
3. A method as in claim 1 wherein the dye is a cationic dye.
4. A method as in claim 1 wherein the dye is a premetallized dye.
5. A method as in claim 1 wherein the polyolefin fiber is a polymer of propylene.
6. A method as in claim 1 wherein the cyclic polyene is dicyclopentadiene.
7. A method as in claim 6 wherein the monoolefin comprises ethylene.
8. A method as in claim 7 wherein the monoolefin comprises a mixture of ethylene and propylene.
9. The product of the process of claim 1.
10. The product of the process of claim 8.

* * * * *